United States Patent
Ishizaki

(10) Patent No.: US 8,862,054 B2
(45) Date of Patent: Oct. 14, 2014

(54) RADIO POWER CONVERTER AND RADIO COMMUNICATION APPARATUS

(75) Inventor: Haruya Ishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 328 days.

(21) Appl. No.: 13/394,751

(22) PCT Filed: Sep. 2, 2010

(86) PCT No.: PCT/JP2010/065456
§ 371 (c)(1),
(2), (4) Date: Mar. 7, 2012

(87) PCT Pub. No.: WO2011/030804
PCT Pub. Date: Mar. 17, 2011

(65) Prior Publication Data
US 2012/0183097 A1     Jul. 19, 2012

(30) Foreign Application Priority Data
Sep. 8, 2009   (JP) .................................. 2009-206694

(51) Int. Cl.
*H04B 5/00*  (2006.01)
*H04B 7/00*  (2006.01)
*H02J 17/00*  (2006.01)

(52) U.S. Cl.
CPC ..................................... *H02J 17/00* (2013.01)
USPC ........................................ 455/41.1; 455/41.2

(58) Field of Classification Search
USPC ................................................. 455/41.1, 41.2
See application file for complete search history.

(56) References Cited

U.S. PATENT DOCUMENTS

| 7,084,605 B2 | 8/2006 | Mickle et al. |
| 8,457,550 B2 | 6/2013 | Goto et al. |
| 8,463,332 B2 | 6/2013 | Sato et al. |
| 2005/0104553 A1 | 5/2005 | Mickle et al. |
| 2008/0058029 A1* | 3/2008 | Sato et al. ..................... 455/573 |
| 2010/0056098 A1* | 3/2010 | Kanno et al. ................ 455/343.1 |
| 2010/0210207 A1* | 8/2010 | Goto et al. .................... 455/41.1 |
| 2010/0256481 A1* | 10/2010 | Mareci et al. ................ 600/423 |

FOREIGN PATENT DOCUMENTS

| JP | 2001-5938 A | 1/2001 |
| JP | 2007517483 A | 6/2007 |
| JP | 200886196 A | 4/2008 |
| JP | 201050515 A | 3/2010 |

(Continued)

OTHER PUBLICATIONS

Alanson Sample, et al., "Experimental Results with two Wireless Power Transfer Systems", 2009 IEEE Radio and Wireless Symposium, Sep. 19, 2009, pp. 16-18, No. MO2A-5.

(Continued)

*Primary Examiner* — Ping Hsien
*Assistant Examiner* — Xin Jia
(74) *Attorney, Agent, or Firm* — Sughrue Mion, PLLC

(57) ABSTRACT

The present invention provides a radio power converter and a radio communication apparatus in which an environmental electromagnetic wave is efficiently converted into an operation power of a semiconductor integrated circuit by using a coil antenna configured within the semiconductor integrated circuit. The radio communication apparatus converts the received environmental electromagnetic wave into a direct-current voltage and charges a decoupling capacitor with an electric power so as to increase the direct-current voltage. A resonance frequencies of an antenna are changed depending upon a value of the increased direct-current voltages. The antenna sequentially receives environmental electromagnetic waves having different resonance frequencies for thereby increasing the direct-current voltage to a desired direct-current voltage.

12 Claims, 6 Drawing Sheets

(56) References Cited

FOREIGN PATENT DOCUMENTS

| | | |
|---|---|---|
| JP | 201055570 A | 3/2010 |
| WO | WO 2005/046040 A2 | 5/2005 |
| WO | 2009043034 A1 | 4/2009 |

OTHER PUBLICATIONS

Haruya Ishizaki, "A 0.2mm2, 27Mbps 3mW ADC/FFT-less FDM BAN receiver with energy exploitation capability", 2009 Symposium on VLSI Circuits Digest of Technical Papers, Jan. 16, 2009, pp. 40-41.

Hiroyuki Nakamoto, et al., "A Passive UHF RF Identification CMOS Tag IC Using Ferroelectric RAM in 0.35-um Technology", IEEE Journal of Solid-State Circuits, Jan. 2007, pp. 101-110, vol. 42, No. 1.

Hiroyuki Nakamoto, et al., "A Passive UHF RFID Tag LSI with 36.6% Efficiency CMOS-Only Rectifier and Current-Mode Demodulator in 0.35um FeRAM Technology", International Solid-State Circuits Conference 2006 Proceedings, 2006, pp. 310-311 and 655, No. 17.2.

Office Action dated Jul. 2, 2014, issued by the Japan Patent Office in corresponding Japanese Application No. 2011-530861.

* cited by examiner

RADIO POWER CONVERTER AND RADIO COMMUNICATION APPARATUS

CROSS REFERENCE TO RELATED APPLICATIONS

This application is a National Stage of International Application No. PCT/JP2010/065456 filed on Sep. 2, 2010, which claims priority from Japanese Patent Application No. 2009-206694, filed on Sep. 8, 2009, the contents of all of which are incorporated herein by reference in their entirety.

TECHNICAL FIELD

The present invention relates to an improvement in power efficiency of an electric circuit. More specifically, the present invention relates to a radio power converter that efficiently converts energy of a received electromagnetic wave into a direct-current voltage, and to a radio communication apparatus having such a radio power converter.

BACKGROUND ART

In a near field communication technology (for example, Body-Area-Networks (BAN)), which assumes about one meter of a communication range, there have been developed techniques to convert energy found around an LSI (Large Scale Integration), such as light, heat, and vibration, into a source power.

Those techniques, called energy harvesting, reduce an apparent power consumption of an LSI. Furthermore, it is possible to save user's manual labor of charging or replacing batteries without reduction in performance of an LSI.

With those techniques, energy of light, heat, or vibration is converted into a source power for an LSI. Accordingly, those techniques require components such as a solar cell, a thermocouple, and an acceleration sensor. It is difficult to mount those components on an LSI with a standard CMOS. Therefore, those components cause an increase of cost in various ways upon energy harvesting. For example, elimination of batteries with the near field communication technology can save labor of replacing batteries or charging but increases the manufacturing cost.

Energy that can be recovered as a power source by an LSI, such as light, is unlimitedly present outside of the LSI. The problem results from the fact that a power converter component has a difficulty in performing a construction process using an existing CMOS circuit.

Accordingly, the inventor believes that the aforementioned problems can be solved by recovering energy from a signal having an energy form that can be processed in a CMOS circuit. The energy form that can readily be processed in a CMOS circuit is the form of an electric signal. The energy of an electric signal can be collected as a power source through the energy of an electromagnetic wave (environmental electromagnetic wave or environmental radio wave) coming from the outside of an LSI.

In order to produce a power source that has no supply source from a device such as a battery and operates with only an environmental radio wave, it is necessary to know the characteristics of an environmental radio wave emitted from radio equipment other than a desired correspondent communication apparatus. First, a radio source (1) having such a high level that it can be solely used as a power source has characteristics that a frequency band or the like varies along with time depending upon the communication environment. (For example, a radio source emitted from radio equipment located close to the target (apparatus).) Furthermore, a radio source (2) having uniform distribution of noise as compared to the radio source (1) has characteristics that an arrived power is very weak. (For example, a radio source emitted from a plurality of radio equipments located away from the target (apparatus).)

In the technology that considers the characteristics of the radio source (1), a radio wave having such intensity that a communication correspondent can use the radio wave as a power source is emitted at a fixed frequency to an LSI so as to supply power to the LSI. This is called a radio frequency identification tag (e.g., RfID). A configuration diagram of the prior art regarding an LSI is illustrated in FIG. 1 (Non-Patent Literature 1). Electromagnetic wave energy is supplied from a reader/writer 101 via antennas 102 to a radio frequency identification tag 103 and is then converted from an alternate current into a direct current by a full-wave rectifier 104. Then the energy is stabilized into a quality that is suitable for a circuit power source and is increased or decreased in voltage by an internal voltage control 106 and a booster 107. Thereafter, the energy is supplied as a power source to internal circuits such as a current-mode demodulator 109 and a logic 110. The conversion efficiency from an alternate current to a direct current can be increased by optimizing the device size of a PMOS rectifier diode 201 and an NMOS rectifier diode 202 included in the full-wave rectifier, of which configuration is illustrated in FIG. 2, or by reducing a loss due to a parasitic capacitor prior to an input to the rectifier diode. In this example, it is necessary to prepare a device for supplying electric power, such as the reader/writer device. This device is required as a separate device apart from data communication.

Furthermore, in the technology that considers the characteristics of the radio source (2), there has been proposed a technique that uses wide-band, high-efficient antennas to convert weak radio waves distributed in a wide band into a form that can be used as an electric power (Non-Patent Literature 2). This technique is regarded as energy harvesting technology using an environmental radio wave as a power source. Nevertheless, an antenna that is too large to be mounted on an LSI is required to recover a weak environmental radio wave. Consequently, this technique cannot fundamentally suppress an increase of cost of an apparatus for energy harvesting.

Furthermore, Patent Literature 1 discloses a technique of receiving electromagnetic wave energy supplied from a reader/writer device via antennas to a radio frequency identification tag and generating a direct-current voltage. The resonance frequency of the antennas in Patent Literature 1 can be adjusted depending upon the apparatus and is tuned to an electromagnetic wave frequency from the reader/writer device so that a value of the direct-current voltage is maximized in the radio frequency identification tag.

PRIOR ART LITERATURE

Patent Literature 1: JP-A 2001-5938
Non-Patent Literature 1: International Solid-State Circuits Conference 2006 Proceedings, No. 17.2
Non-Patent Literature 2: 2009 IEEE Radio and Wireless Symposium, No. MO2A-5

DISCLOSURE OF THE INVENTION

Problem(s) to be Solved by the Invention

Radio power converters described with reference to Non-Patent Literatures 1 and 2 have the following problems.

In the aforementioned radio frequency identification tag (particularly a passive type that operates with energy of a radio wave emitted from a reader/writer device), the radio frequency identification tag can receive energy having a required intensity from a radio wave having a fixed frequency. Therefore, the radio frequency identification tag can obtain an operating power if the antenna has a relatively low efficiency but has a rectifier/decoupling capacitor. On the other hand, a passive type radio frequency identification tag suffers from problems of high system cost including a reader and large power consumption. This is because a wasteful power that is not directed to the radio frequency identification tag is inevitably generated if power is supplied from the reader/writer device to the radio frequency identification tag under an isotropic transmission environment having no antenna directivity. Even if the efficiency of power transmission between the reader/writer device and the radio frequency identification tag is enhanced in consideration of the antenna directivity, a wasteful power is inevitably generated in a space as long as power is transmitted by an electromagnetic wave. Thus, an electromagnetic wave having energy higher than a power required in the radio frequency identification tag need to be emitted from the reader/writer. In view of the entire system including the reader/writer device and the radio frequency identification tag, a problem is to reduce a wasteful power. This problem similarly exists in Patent Literature 1.

Furthermore, the energy harvesting using the aforementioned recovery technique of an environmental radio wave recovers the energy of an electromagnetic wave that has basically been useless noises around an LSI. In principle, therefore, the system cost for recovering the energy of an electromagnetic wave increases while the system reduces an electric power being supplied. This is because an environmental radio wave to be recovered is uncertainly distributed on the frequency axis and is very weak. Accordingly, the system needs to maintain a long antenna length for widening the band and to reduce a parasitic resistance of wiring of the antenna for reducing thermal noise losses. However, those countermeasures are difficult to achieve with a standard CMOS. Accessories (components) such as a coil and an antenna outside of an LSI are indispensable to those countermeasures. Those parts used along with the LSI cause an increase of the system cost. However, those countermeasures are difficult to achieve with a standard CMOS. Accessories (components) such as a coil and an antenna outside of an LSI are indispensable to those countermeasures. Those parts used along with the LSI cause an increase of the system cost.

Considering the above, the present invention provides a radio power converter that takes in an environmental radio wave as a power source for a semiconductor integrated circuit with use of a coil and an antenna that can be arranged within the semiconductor integrated circuit and without use of external components such as a coil and an antenna, and can reduce cost of the system and eliminate batteries.

Means to Solve the Problem

A radio power converter according to the present invention is comprising: an antenna including a coil, a fixed capacitor, and a variable capacitor; a rectifier which outputs a rectified signal from an alternate-current signal outputted from the antenna; a decoupling capacitor which is charged with the rectified signal so that the rectified signal is held as a direct-current voltage; and a VDD level determination circuit which divides the direct-current voltage being held and outputs N control signals to control a value of the variable capacitor (where N is a positive integer), wherein the antenna receives an environmental electromagnetic wave having the same frequency as an antenna resonance frequency to convert the environmental electromagnetic wave into an electric power that is to charge the decoupling capacitor and to thereby increase the direct-current voltage, wherein the antenna resonance frequency is changed by varying the variable capacitor depending upon a value of the direct-current voltage increased, and wherein the antenna receives the environmental electromagnetic wave in a frequency band that corresponds to the direct-current voltage being increased and to thereby increase the direct-current voltage to a desired direct-current voltage.

Furthermore, a radio communication apparatus according to the present invention is comprising: the aforementioned radio power converter; a digital modulation signal generator; and a modulator, wherein the digital modulation signal generator outputs a data sequence included therein to the modulator so as to transmit the data sequence from the antenna in which the modulator is provided.

Moreover, a voltage increase operation method of a radio power converter according to the present invention is comprising: an antenna including a coil, a fixed capacitor, and a variable capacitor; a rectifier for outputting a rectified signal from an alternate-current signal outputted from the antenna; a decoupling capacitor which is charged with the rectified signal so that the rectified signal is held as a direct-current voltage; and a VDD level determination circuit for dividing the direct-current voltage being held and outputting N control signals for controlling a value of the variable capacitor (where N is a positive integer), wherein the direct-current voltage is a ground potential, and, when an antenna resonance frequency is a first antenna resonance frequency, the antenna performs a first step of receiving an environmental electromagnetic wave having the same frequency as the first antenna resonance frequency so as to increase the direct-current voltage to a first voltage and changing the antenna resonance frequency from the first antenna resonance frequency to a second antenna resonance frequency depending upon a value of the direct-current voltage increased to the first voltage, the antenna performs a second step of receiving an environmental electromagnetic wave having the same frequency as the second antenna resonance frequency so as to increase the direct-current voltage to a second voltage and changing the antenna resonance frequency from the second antenna resonance frequency to a third antenna resonance frequency depending upon the value of the direct-current voltage increased to the second voltage, and the second step is repeated to increase the value of the direct-current voltage to a desired voltage value.

Effect(s) of the Invention

According to the present invention, it is possible to acquire operability with an electric power lower than that required in a system formed of an existing radio frequency identification tag or the like. This is for the following reasons: Sufficient power supply should be provided to an existing passive type radio frequency identification tag from a reader/writer device. Sufficient power supply should be provided to an active type radio frequency identification tag from a battery or the like. However, according to the present invention, energy can be taken as a power source from an environmental radio wave around a semiconductor integrated circuit. In other words, according to the present invention, it is possible to obtain a radio power converter or a radio communication apparatus that can reduce or eliminate a power supply from a battery or a reader/writer device.

Furthermore, according to the present invention, it is possible to reduce cost as compared to existing energy harvesting technology. This is because communication is started after a frequency band in which an environmental radio wave is intensive is swept at the time of start-up of operation. This is because an antenna, which would cause an increase of cost of the apparatus, is unnecessary (The antenna is high spec, which collects electric power simultaneously from a wideband).

DESCRIPTION OF REFERENCE NUMERALS

Figure 1:
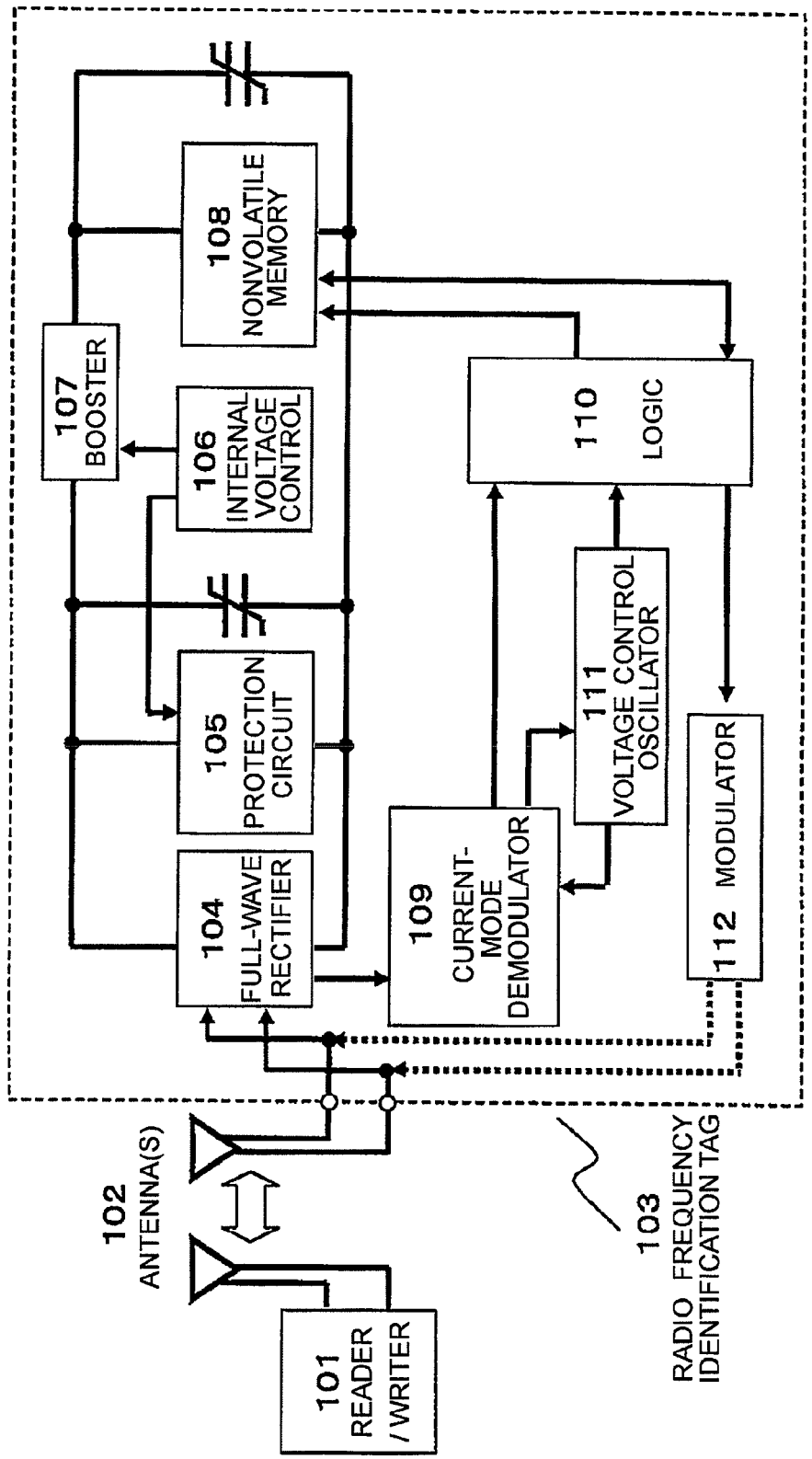
FIG. 1 is a configurational block diagram of a radio frequency identification tag receiver of the related art (Non-Patent Literature 1).
Figure 2:
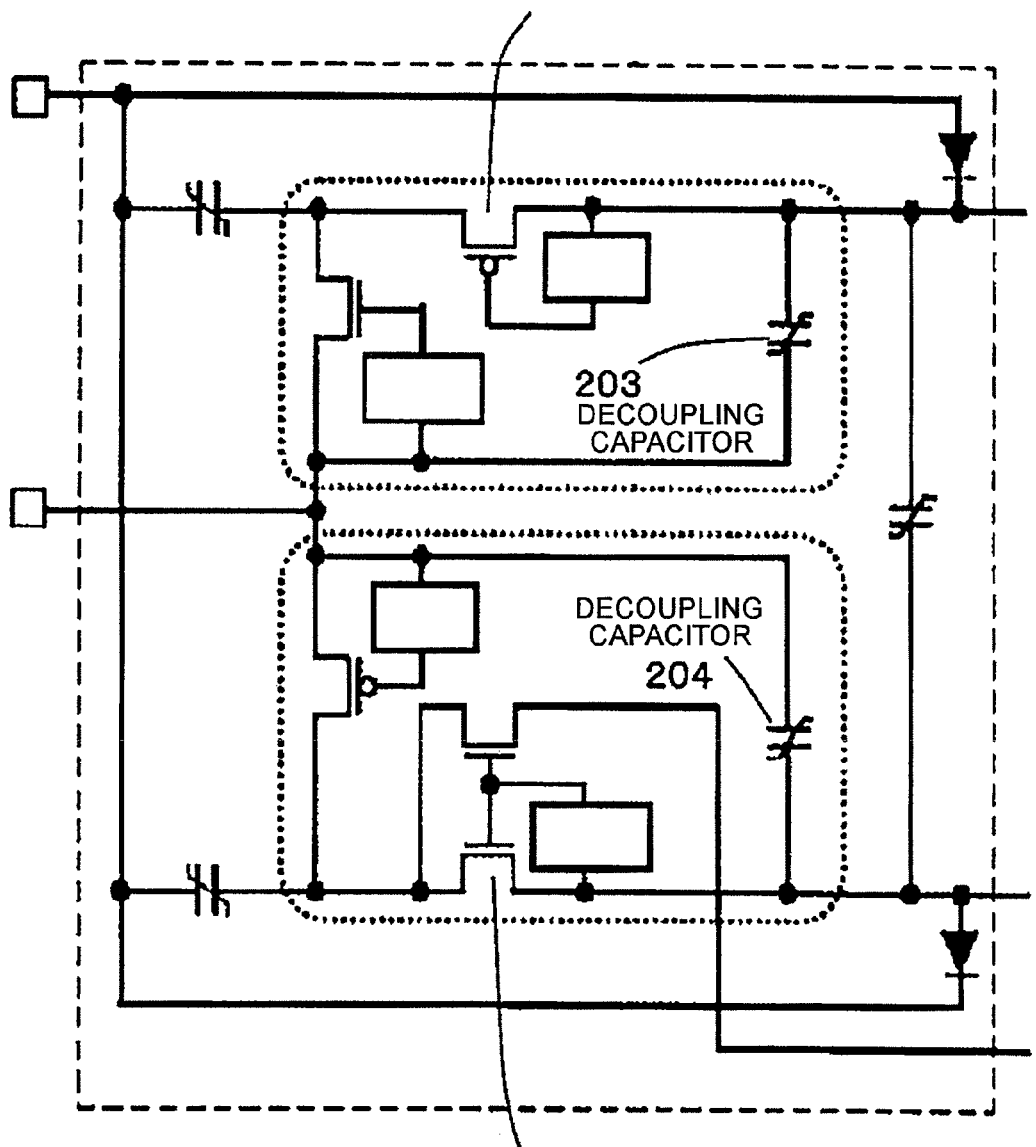
FIG. 2 is a circuit diagram of a full-wave rectifier in the radio frequency identification tag receiver shown in FIG. 1.

101 reader/writer
102 antenna(s)
103 radio frequency identification tag
104 full-wave rectifier
105 protection circuit
106 internal voltage control power amplifier (PA)
107 booster
108 nonvolatile memory
109 current-mode demodulator
110 logic
111 voltage control oscillator
112 modulator
201 PMOS rectifier diode
202 NMOS rectifier diode
203, 204 decoupling capacitor
301 coil
302 capacitor
303 antenna
304 control signal
305 variable capacitor
306 rectifier
307 decoupling capacitor
308 VDD line
309 VDD level determination circuit
310 digital modulation signal generator
311 digital modulation signal
312 modulator
401 capacitor
402 switch
403 digital control signal
404, 405 input
406, 407 diode
408 rectifier
409 decoupling capacitor
501 VDD line
502 group of diodes
503 digital control signal

MODE(S) FOR CARRYING OUT THE INVENTION

First Embodiment

A first embodiment of the present invention will be described in detail with reference to the drawings.

Figure 3:
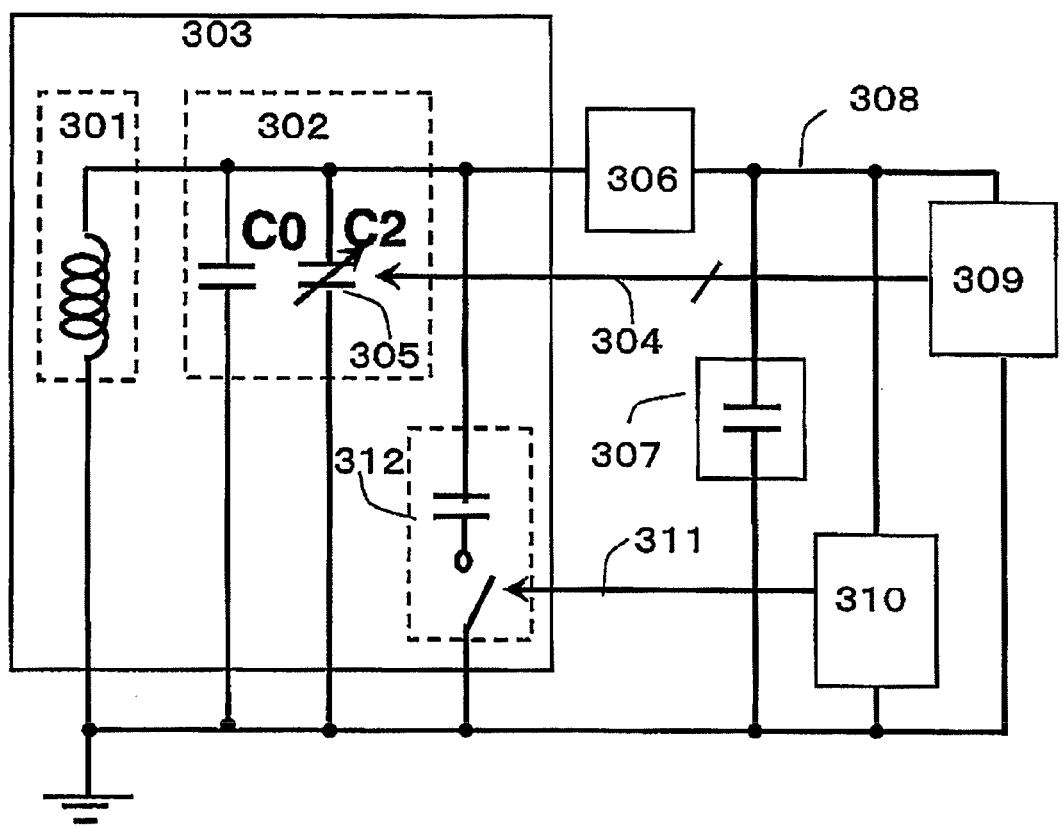
FIG. 3 is a configurational block diagram of a radio communication apparatus having a radio power converter according to the present invention.
Figure 4A:
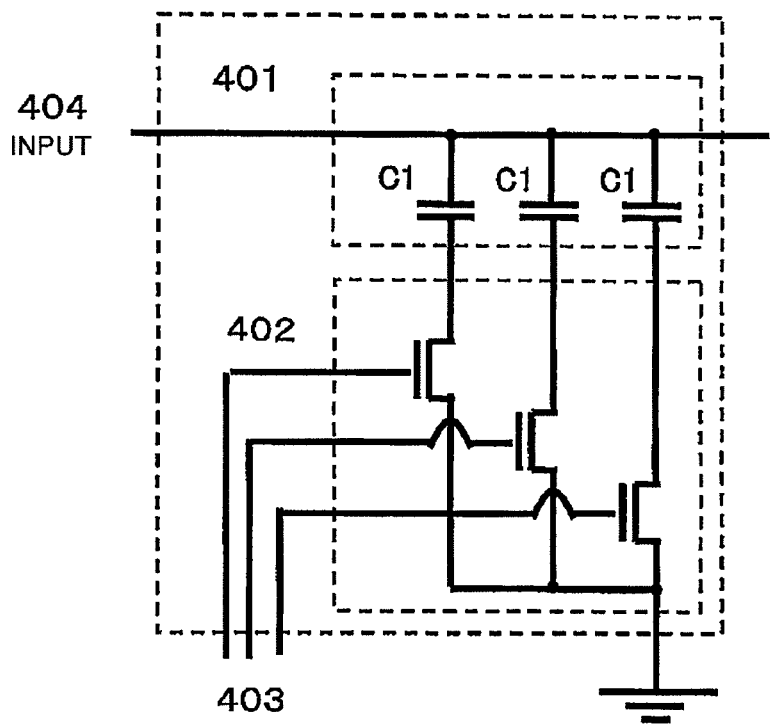
FIGS. 4A and 4B are circuit diagrams of a variable capacitor (FIG. 4A) and a rectifier and a decoupling capacitor (FIG. 4B) of a radio power converter shown in FIG. 3.
Figure 4B:
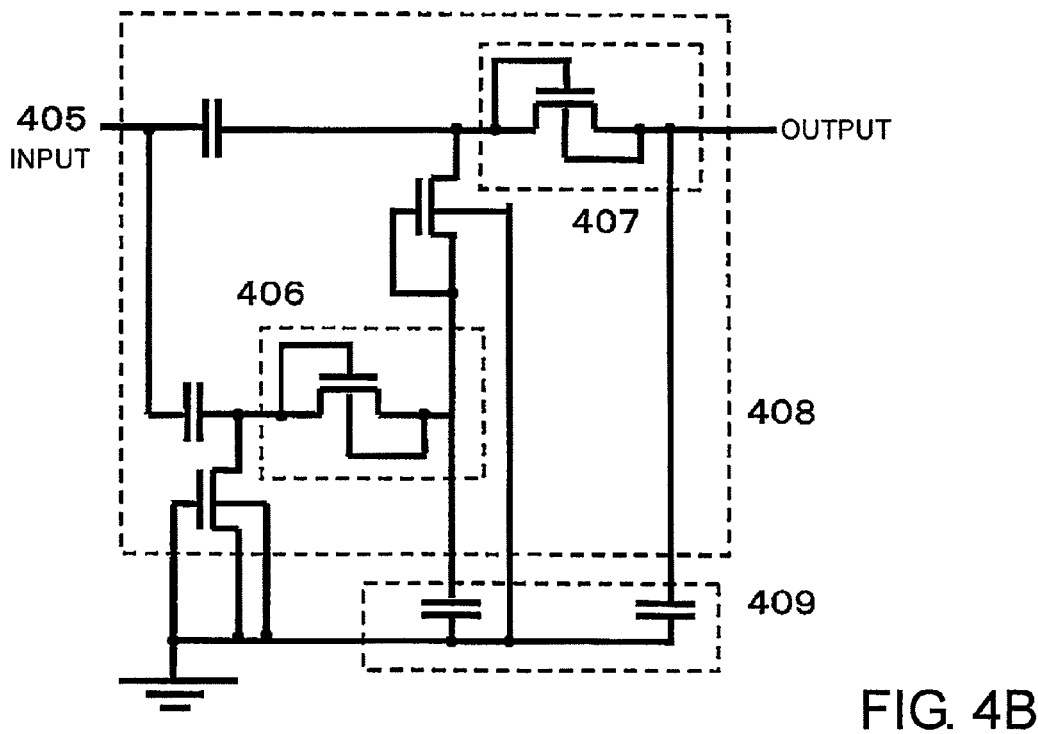
Figure 5:
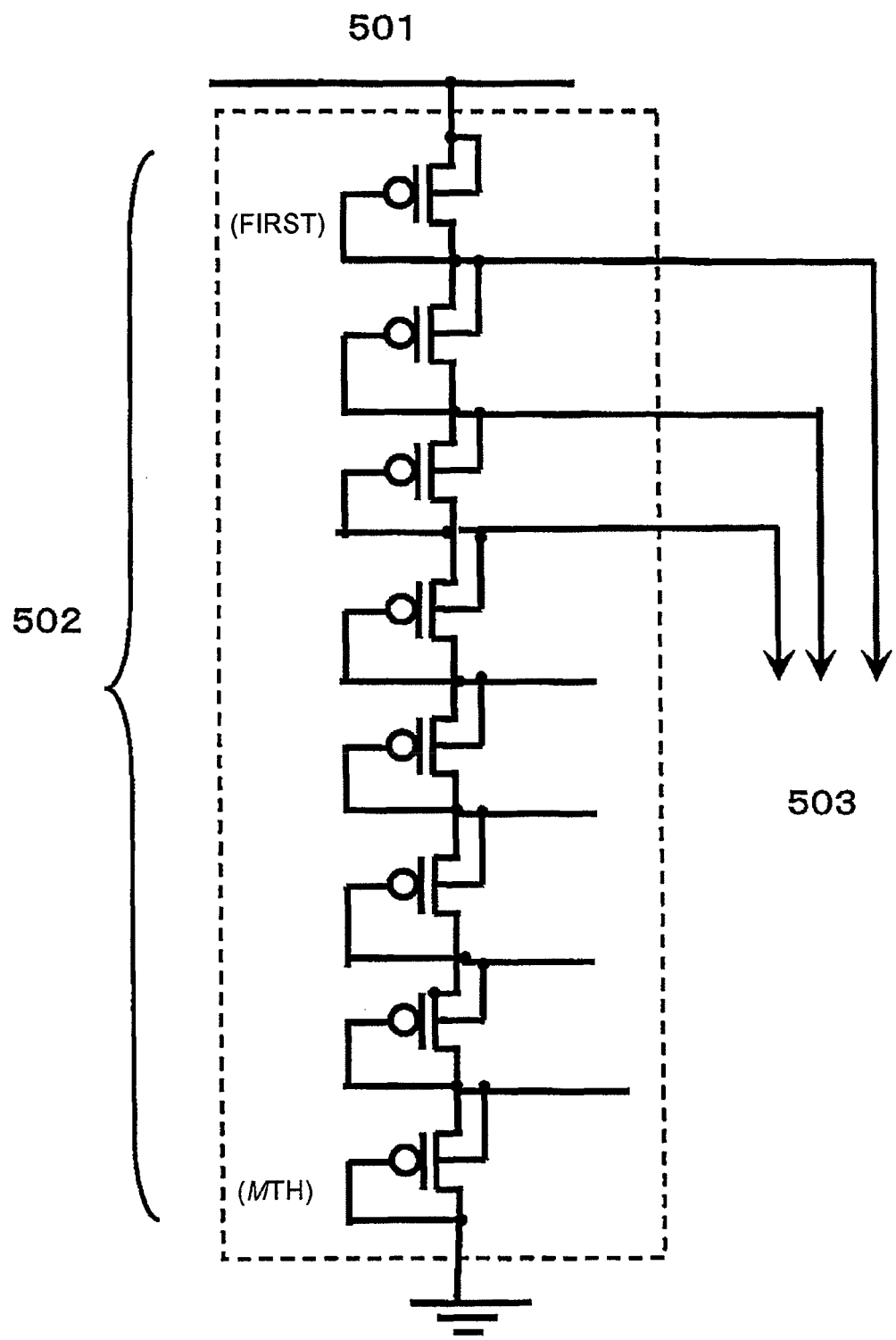
FIG. 5 is a circuit diagram of a VDD level determination circuit in a radio power converter shown in FIG. 3.
Figure 6:
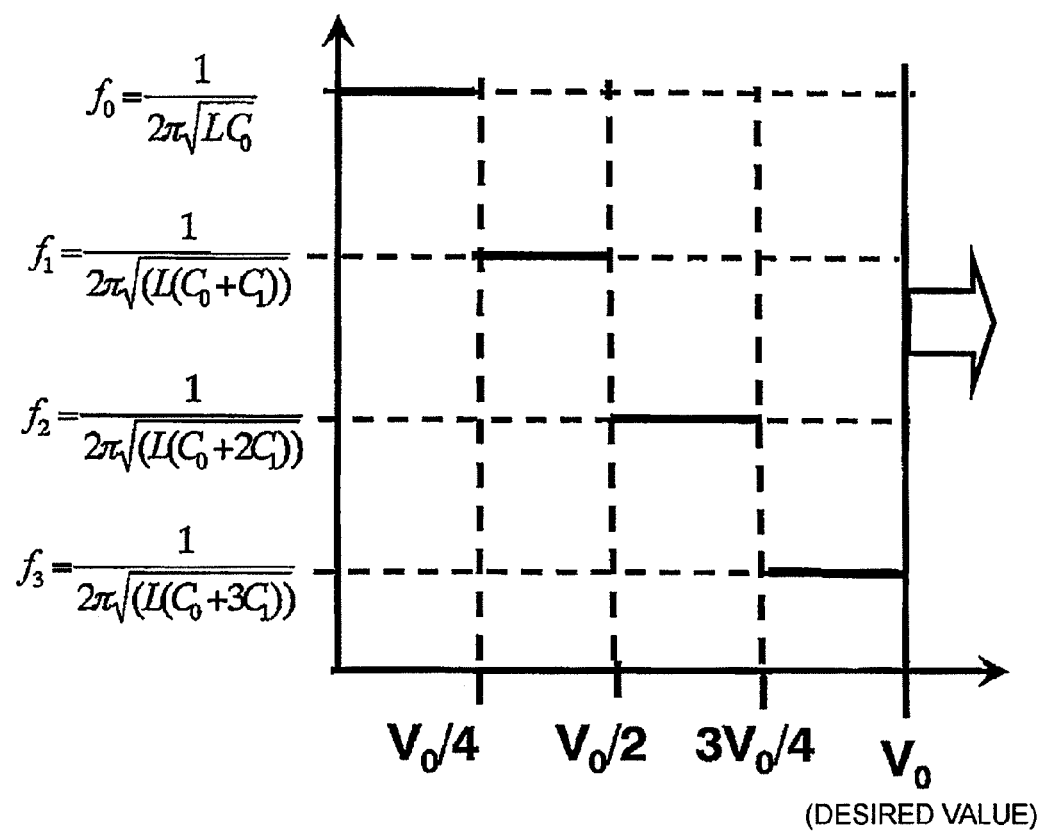
FIG. 6 is an operation diagram of a radio power converter according to the present invention.

FIG. 3 is a configurational block diagram of a radio communication apparatus having a radio power converter according to the present invention. FIGS. 4A, 4B, and 5 are circuit diagrams of a variable capacitor, a rectifier and a decoupling capacitance, and a VDD level determination circuit of the radio power converter shown in FIG. 3, respectively. FIG. 6 is an operation diagram of a radio power converter according to the present invention.

The radio communication apparatus shown in FIG. 3 includes an antenna 303, a rectifier 306, a decoupling capacitor 307, a VDD level determination circuit 309, and a digital modulation signal generator 310. The antenna 303 includes a coil 301, a capacitor 302, and a modulator 312 connected in parallel to each other. The inductance L of the coil 301 and the capacitance C of the capacitor 302 are determined so that the antenna 303 can convert an electromagnetic wave (energy) coming from the outside of the radio communication apparatus into an electric signal having a resonance peak (resonance frequency) at a frequency f. The capacitor 302 includes a fixed capacitor (capacitance C0) and a variable capacitor 305 (capacitance C2). The capacitance of the capacitor 302 is represented by the sum C0+C2. The capacitance of the variable capacitor 305 (=C2) can be varied by N control signals supplied from the VDD level determination circuit 309 (hereinafter referred to as digital control signals 304). In this radio communication apparatus, the digital modulation signal generator 310 and the modulator 312 of the antenna 303 form a modulation signal output portion, and the rest of electronic parts form a radio power converter.

The radio power converter varies the capacitance of the variable capacitor 305 depending upon changes of the digital control signals 304 and varies a resonance peak of the antenna 303 from f. An example of a circuit diagram of the variable capacitor is illustrated in FIG. 4A. A capacitor 401 is connected to a switch 402. This value is varied by digital control signals 403 connected to the switch 402 from the exterior of the variable capacitor. Each of switches, which constitute the switch 402, is connected to one of the N control signals. Those switches have thresholds to sequentially turn on until an output voltage increases from GND to a desired value $V_0$. Each of capacitors arranged in parallel, which constitute the capacitor 401, is electrically connected or disconnected by the corresponding switch of the switch 402. Whether or not those capacitors are included to calculate the value of the capacitor 401 is controlled based upon the control signals. Thus, the capacitance of the capacitor 401 with respect to GND as viewed from an input 404 can be changed by the digital control signals. For the sake of brevity, the capacitors of the capacitor 401 are illustrated as having the same capacitance C1 in FIG. 4A. Nevertheless, capacitances of those capacitors may not necessarily be the same and may be set to be any value suitable to set a resonance frequency.

An electric signal (energy) into which an electromagnetic wave has been converted in the antenna 303 is inputted into the rectifier 306. The rectifier 306 is formed by a plurality of diodes. Each of the diodes outputs only a positive component from positive and negative components of an alternate current of the electric signal by half-wave rectification. The rectifier 306 is connected to the decoupling capacitor 307. The rectified electric signal outputted from the rectifier 306 is accumulated in the decoupling capacitor 307 by charging. A line connecting the rectifier 306 and the decoupling capacitor 307 to each other is referred to as a power source voltage (hereinafter abbreviated to as VDD) line 308. FIG. 4B shows an example of a circuit diagram of the rectifier and the decoupling capacitor. In FIG. 4B, a rectifier 408 has two stages of a diode 406 and a diode 407. Furthermore, a decoupling capacitor 409 is formed by capacitors respectively connected to those diodes. Specifically, an alternate-current output signal of the antenna 303 that has been inputted from an input 405 is subjected to half-wave rectification at each of the diodes 406 and 407. Outputs of the diodes charge the decoupling capacitor 409.

The signal level held at the decoupling capacitor 307 through the VDD line 308 is inputted to each of the VDD level determination circuit 309 and the digital modulation signal generator 310. FIG. 5 shows an example of a circuit configuration of the VDD level determination circuit 309. The VDD level determination circuit 309 includes a group of M diodes 502 connected in series between a potential level of the VDD line 501 (308) and a ground potential (GND) level (where M is a positive integer). The reason for using a group of M diodes is to divide the level from the GND level to the voltage level of the VDD line 501 into M equal levels. Therefore, the VDD level determination circuit 309 may be formed by resistance division. The VDD level determination circuit 309 equally divides a potential difference applied to each node from the VDD line 501 to the GND into M equal potentials. The VDD level determination circuit 309 outputs such a control signal that the variable capacitor is digitally varied by N signals, which correspond to a value of a voltage applied to all of the M diodes or N diodes less than M diodes (where N is a positive integer).

Referring again to FIG. 3, the N control signals 304 outputted from the VDD level determination circuit 309 are connected to the variable capacitor 305 in the antenna 303.

In the VDD level determination circuit 309, the output voltage levels of N lines of the control signal are increased as the voltage level of the VDD line 308 becomes high with respect to the GND. The output levels of the N control signals 304 include many components having a value higher than a transistor gate threshold of each of the switches (see FIG. 4A) in the variable capacitor 305. Therefore, the transistors sequentially turn on based on a voltage of the control signal line to which each of transistors operating as a switch is connected, thereby varying a variable capacitance. This connection provides one-to-one correspondence between the voltage level of the VDD line 308 and the value of the variable capacitor 305. Specifically, since the variable capacitor 305 corresponds to the resonance peak value of the antenna 303, the voltage level of the VDD line 308 is linked to the resonance peak value of the antenna 303.

Meanwhile, the digital modulation signal generator 310 holds Q-bit data therein. When the voltage level held at the VDD line 308 reaches a desired value $V_0$, the digital modulation signal generator 310 outputs a digital modulation signal 311 having a Q-bit data sequence at certain time intervals. The digital modulation signal 311 outputted from the digital modulation signal generator 310 is inputted to the modulator 312 in the antenna. The configuration of the digital modulation signal generator 310 is not limited except that the digital modulation signal generator 310 has a function of outputting the digital modulation signal 311.

Next, operation according to the first embodiment will be described in detail with reference to the configurational examples of FIGS. 3, 4A, 4B, and 5 and the operation diagram of FIG. 6.

First, it is assumed that the voltage level held at the VDD line 308 is equal to the GND at the beginning of operation. Accordingly, voltages applied to the M diodes of the VDD level determination circuit 309 are 0 V. Therefore, all of the N control signals 304, which have divided potentials from the VDD line 308 to the GND, output the same value as the GND. Thus, all of the capacitors forming the variable capacitor 305 (see FIG. 4A) are turned off (disconnected). As a result, the value of the capacitor 302 in the antenna 303 consists of the fixed capacitance C0. The resonance peak value f of the antenna 303 is expressed by the following formula 1.

$$f_0 = \frac{1}{2\pi\sqrt{L \times C_0}} \quad \text{(formula 1)}$$

In the frequency characteristics of the antenna 303 as shown in FIG. 6, a larger value means that an electric signal outputted from the antenna 303 has a higher power (energy). This means that an electric power that can be supplied for a circuit operation increases at that frequency. Therefore, when the circuit thus configured is to be operated only by an electric power recovered from the antenna 303, an electromagnetic wave having an intensity required within a range of a band width fd having a recovery efficiency that can cover an electric power for the circuit thus configured under initial conditions should come to the circuit thus configured at the time of start-up of operation. Therefore, the power energy is accumulated as a direct-current component in the decoupling capacitor 307 through conversion of the electromagnetic wave into an electric signal at the antenna 303 and rectification at the rectifier 306. The power energy increases along with time according to the voltage level of the VDD line 308.

The voltage level of the VDD line 308 increases along with time after the start-up of operation. In accordance with the increase of the voltage, the switches of the variable capacitor 305 sequentially turn on. As a result, the value of the resonating capacitors connected in parallel to the coil 301 increases, so that the resonance frequency of the antenna 303 decreases (see the following formula 2). In the formula 2, n represents the number of transistors turned on. The unit capacitance forming the variable capacitor 302 is defined equally as C1 but may have any value in practical.

$$f_n = \frac{1}{2\pi\sqrt{(L \times (C_0 + nC_1))}} \quad \text{(formula 2)}$$

FIG. 6 shows how the antenna resonance frequency shifts in accordance with the voltage level held at the VDD line 308. FIG. 6 illustrates that the resonance frequency of the antenna 303 discretely shifts along with the voltage level held at the VDD line 308. When the voltage level of the VDD line 308 (also referred to as a value of a direct-current voltage) reaches a desired value $V_0$, the shifting of the resonance point stops. Specifically, after a power source voltage sufficient for operation of the circuit configuration has been found, the frequency characteristics of the antenna 303 are fixed. By fixing the frequency characteristics of the antenna 303, the voltage level held at the VDD line 308 is maintained.

FIG. 6 illustrates a case where the variable capacitor shown in FIG. 4 is used. In FIG. 6, the value of the direct-current voltage is increased respectively to four stages of voltage levels by four resonance frequencies ($f_0$, $f_1$, $f_2$, and $f_3$). The value of the direct-current voltage is increased from the GND to $V_0/4$ by the resonance frequency $f_0$, from $V_0/4$ to $V_0/2$ by the resonance frequency $f_1$, from $V_0/2$ to $3V_0/4$ by the resonance frequency $f_2$, and from $3V_0/4$ to $V_0$ (desired value) by the resonance frequency $f_3$. Increases of the direct-current voltage within one interval of the resonance frequency are equal to each other and are $V_0/4$. However, the number of the resonance frequencies (f determined by the variable capacitor) and a voltage by which the voltage level is increased by one resonance frequency may be set in any way. The number of the resonance frequencies is preferably large. The resonance frequency is represented by the frequency of the resonance peak. The frequency band that can be received by the antenna includes the frequency of the resonance peak and a frequency band around the resonance peak. Therefore, the resonance peak and a frequency band around the resonance peak may also be used as the resonance frequency.

Furthermore, it is preferable to design the circuit configuration such that an operation of increasing the voltage is performed with switching into many resonance frequencies in a voltage range immediately before the voltage is increased to a desired direct-current voltage level ($V_0$) and, for example, in a voltage range in which the digital modulation signal generator can operate. If a value of the increased direct-current voltage becomes so high that it is close to the desired direct-current voltage (e.g., from $3V_0/4$ to $V_0$), then a setting range of the direct-current voltage to be increased with one resonance frequency is preferably narrower than that in a case where a value of the increased direct-current voltage is low (e.g., from the GND to $3V_0/4$). In other words, the circuit configuration is designed so as to narrow a range of the direct-current voltage to be increased with one resonance frequency and to switch into many resonance frequencies when a value of the increased direct-current voltage becomes high.

In the case of switching into many resonance frequencies in a narrow voltage range, a frequency band of intense electromagnetic waves among environmental radio waves can be used. Use of a frequency band of intense electromagnetic waves allows a voltage level near the desired voltage level ($V_0$) to stably be obtained and allows a circuit using the direct-current voltage to stably be operated. Therefore, a configuration capable of switching into many resonance frequencies enables to deal with frequencies of indefinite environmental radio waves. Accordingly, a radio power converter according to the present invention that can switch into many resonance frequencies can be called an adaptive radio power converter that can readily be adapted to environmental radio waves in particular.

When the direct-current voltage of the VDD line 308 is increased to the desired voltage ($V_0$) and held at the voltage level of the desired voltage as in the above operation, then the radio communication apparatus is shifted to a communication operation for transmitting data held in a semiconductor integrated circuit. First, a Q-bit data sequence is serialized at the digital modulation signal generator 310, is outputted as the digital modulation signal 311, and is inputted into the modulator 312. Meanwhile, when the digital modulation signal 311 has a "high" level, the capacitor in the modulator 312 is turned on so as to reflect the received environmental radio wave. With this operation, the received environmental radio wave is not inputted to the rectifier 306. Therefore, the decoupling capacitor 307 is not charged with the power energy, and the recovered power is only consumed in circuits including the digital modulation signal generator 310 and the like. Accordingly, the voltage level being held at the VDD line 308 is gradually decreased.

When the digital modulation signal has a "low" level, the modulator 312 is turned off. The received environmental radio wave is not reflected and is charged as an electric power in the decoupling capacitor as in the case of the start-up of the operation. With the above operation, if data transmission continues, a resonance point of the antenna 303 changes inversely to the changes at the time of the start-up of the operation. The resonance point gradually changes into a higher frequency upon transmission of "high" data and moves to a lower frequency due to a charging operation upon transmission of "low" data. Accordingly, those changes of the resonance point are cancelled out. As a result, during transmission of data, the frequency characteristics of the antenna 301 are fixed around a frequency band in which an environmental radio wave is detected to be intensive at the time of the start-up of the operation.

As described above, according to the present invention, there can be obtained a radio power converter that efficiently converts an inputted environmental electromagnetic wave into a direct-current voltage. A radio power converter according to the present invention has an antenna including a coil, a fixed capacitor, and a variable capacitor, a rectifier for outputting a rectified signal from an alternate-current signal outputted from the antenna, a decoupling capacitor which is charged with the rectified signal so that the rectified signal is held as a direct-current voltage, and a VDD level determination circuit for dividing the direct-current voltage being held and outputting N control signals for controlling a value of the variable capacitor (where N is a positive integer). The antenna receives an environmental electromagnetic wave having the same frequency as an antenna resonance frequency. And the antenna converts the environmental electromagnetic wave into a direct-current voltage for thereby increasing the direct-current voltage. The antenna resonance frequency is changed depending upon a value of the increased direct-current voltage. The antenna receives an environmental electromagnetic wave having the same frequency as the antenna resonance frequency corresponding to the direct-current voltage being increased for thereby increasing the direct-current voltage to a desired direct-current voltage.

Furthermore, a radio communication apparatus having such a radio power converter can be obtained. The radio communication apparatus can convert an electromagnetic wave from a single antenna into a certain voltage level with a rectifier and a decoupling capacitor and can generate a digital modulation signal. Accordingly, the radio communication apparatus cannot deal with data reception but can use an antenna for two functions of power conversion and output of a modulated signal. Thus, an increase of cost caused by the number of antennas can be reduced. When a radio power converter according to the present invention is used as a power source for conversion of an environmental radio wave into a direct-current voltage, the radio communication apparatus can be configured without any battery or power supply from a reader/writer.

It is preferable to eliminate a battery from the radio communication apparatus. As needed, however, the radio communication apparatus may be configured such that a battery can be used in parallel to a radio power converter according to the present invention.

Furthermore, the power obtained from the radio power converter may be used for all of operations of a semiconductor integrated circuit or may be used only for transmission of a data sequence from the antenna.

Moreover, components of the radio power converter in the radio communication apparatus are formed in a semiconductor integrated circuit. Nevertheless, analog components may be provided as accessory parts of the semiconductor integrated circuit.

Although the present invention has been described along with some embodiments, the present invention is not limited to the above embodiments. Various modifications can be made in the configuration and details of the present invention within the scope of the present invention.

This application claims the benefit of priority from Japanese patent application No. 2009-206694, filed on Sep. 8, 2009, the disclosure of which is incorporated herein in its entirety by reference.

The invention claimed is:

1. A radio power converter operable to convert an inputted environmental electromagnetic wave into a direct-current voltage, comprising:
an antenna including a coil, a fixed capacitor, and a variable capacitor;
a rectifier which outputs a rectified signal from an alternate-current signal outputted from the antenna;
a decoupling capacitor which is charged with the rectified signal so that the rectified signal is held as a direct-current voltage; and
a VDD level determination circuit which divides the direct-current voltage being held and outputs N control signals (where N is a positive integer) to control a value of the variable capacitor,
wherein the antenna receives an environmental electromagnetic wave having the same frequency as an antenna resonance frequency to convert the environmental electromagnetic wave into an electric power that is to charge the decoupling capacitor and to thereby increase the direct-current voltage,
wherein the antenna resonance frequency is changed by varying the variable capacitor depending upon a value of the direct-current voltage increased,
wherein the antenna receives the environmental electromagnetic wave in a frequency band that corresponds to the direct-current voltage being increased and to thereby increase the direct-current voltage to a desired direct-current voltage, and
wherein an interval of assigning a voltage range of the direct-current voltage being increased specifies a single antenna resonance frequency to be set to the antenna and has a narrow voltage range as a value of the increased direct-current voltage becomes close to the desired direct-current voltage.

2. The radio power converter as recited in claim 1, wherein, the operation of increasing the voltage is stopped when the direct-current voltage has been increased to the desired direct-current voltage, and the operation of increasing the voltage is restarted when the increased direct-current voltage is lowered from the desired direct-current voltage.

3. A radio communication apparatus comprising: the radio power converter as recited in claim 1; a digital modulation signal generator; and a modulator,
wherein the digital modulation signal generator outputs, to the modulator, a data sequence which is included therein and which is transmitted from the antenna coupled to the modulator.

4. The radio communication apparatus as recited in claim 3, wherein, the radio power converter starts the conversion to the direct-current voltage when it receives the environmental electromagnetic wave, and transmits the data sequence after the direct-current voltage has been increased to the desired direct-current voltage.

5. The radio communication apparatus as recited in claim 3, wherein, data are transmitted by reflecting the received environmental electromagnetic wave when data of the data sequence have a high level and by acquiring an operational power from the received environmental electromagnetic wave when the data of the data sequence have a low level.

6. The radio communication apparatus as recited in claim 3, wherein, the radio power converter is formed within a semiconductor integrated circuit.

7. The radio communication apparatus as recited in claim 6, wherein, the radio power converter is formed in the semiconductor integrated circuit with use of a standard CMOS logic.

8. A voltage increase operation method of a radio power converter that acquires an electric power from an environmental electromagnetic wave, comprising:
an antenna including a coil, a fixed capacitor, and a variable capacitor;
a rectifier which outputs a rectified signal from an alternate-current signal outputted from the antenna;
a decoupling capacitor which is charged with the rectified signal so that the rectified signal is held as a direct-current voltage; and
a VDD level determination circuit which divided the direct-current voltage being held and outputs N control signals (where N is a positive integer) to control a value of the variable capacitor,
wherein the direct-current voltage is a ground potential, and, when an antenna resonance frequency is a first antenna resonance frequency, the antenna performs a first step of receiving an environmental electromagnetic wave having the same frequency as the first antenna resonance frequency so as to increase the direct-current voltage to a first voltage and changing the antenna resonance frequency from the first antenna resonance frequency to a second antenna resonance frequency depending upon the value of the direct-current voltage increased to the first voltage,
wherein the antenna performs a second step of receiving an environmental electromagnetic wave having the same frequency as the second antenna resonance frequency so as to increase the direct-current voltage to a second voltage and changing the antenna resonance frequency from the second antenna resonance frequency to a third antenna resonance frequency depending upon the value of the direct-current voltage increased to the second voltage,
wherein the second step is repeated to increase the direct-current voltage to a desired voltage, and
wherein an interval of assigning a voltage range of the direct-current voltage being increased specifies a single antenna resonance frequency to be set to the antenna and has a narrow voltage range as a value of the increased direct-current voltage becomes close to the desired direct-current voltage.

9. The voltage increase operation method of a radio power converter as recited in claim 8, wherein, the radio power converter is formed within a semiconductor integrated circuit.

10. The radio power converter as recited in claim 1, wherein, the radio power converter is formed within a semiconductor integrated circuit.

11. The radio power converter as recited in claim 1, wherein, the radio power converter is formed in the semiconductor integrated circuit with use of a standard CMOS logic.

12. The voltage increase operation method of a radio power converter as recited in claim 8, wherein, the radio power converter is formed in the semiconductor integrated circuit with use of a standard CMOS logic.

* * * * *